(12) United States Patent
Han et al.

(10) Patent No.: US 9,886,813 B2
(45) Date of Patent: Feb. 6, 2018

(54) PROVIDING MULTIMEDIA CONTENTS TO USER EQUIPMENT ASSOCIATED WITH ELECTRIC VEHICLE

(71) Applicant: KT CORPORATION, Gyeonggi-do (KR)

(72) Inventors: Jong-Hoon Han, Gyeonggi-do (KR); Ki-Jung Kim, Gangwon-do (KR)

(73) Assignee: KT CORPORATION, Gyeonggi-do (KR)

( * ) Notice: Subject to any disclaimer, the term of this patent is extended or adjusted under 35 U.S.C. 154(b) by 229 days.

(21) Appl. No.: 14/201,839

(22) Filed: Mar. 8, 2014

(65) Prior Publication Data

US 2014/0258457 A1 Sep. 11, 2014

(30) Foreign Application Priority Data

Mar. 8, 2013 (KR) ........................ 10-2013-0024862

(51) Int. Cl.
*G07F 15/00* (2006.01)
*H04L 29/12* (2006.01)
*H04L 29/06* (2006.01)
*B60L 11/18* (2006.01)
*H04L 29/08* (2006.01)

(52) U.S. Cl.
CPC .......... *G07F 15/005* (2013.01); *G07F 15/003* (2013.01); *G07F 15/008* (2013.01); *H04L 61/2007* (2013.01); *H04L 65/1073* (2013.01); *H04L 65/4084* (2013.01); *B60L 11/1846* (2013.01); *H04L 61/103* (2013.01); *H04L 67/12* (2013.01)

(58) Field of Classification Search
CPC .................................................. H04L 61/2007
See application file for complete search history.

(56) References Cited

U.S. PATENT DOCUMENTS 8,171,517 B2 * 5/2012 Hicks, III ............... A63F 13/12
72/116
8,249,933 B2 * 8/2012 Sakakibara ........... B60L 11/123
340/988

(Continued)

FOREIGN PATENT DOCUMENTS

JP 2005-512408 A 4/2005
JP 2007-026108 A 2/2007

(Continued)

*Primary Examiner* — Jimmy H Tran
(74) *Attorney, Agent, or Firm* — IP Legal Services, LLC

(57) ABSTRACT

Described embodiments relate to providing a multimedia contents service to user equipment associated with an electric vehicle located in an electric vehicle charging station through a wireless access point. The wireless access point may allocate an Internet Protocol (IP) address to user equipment associated with an electric vehicle located in an electric vehicle charging station in response to a connection request message received from the user equipment. Then, the wireless access point may transmit a request message to a service server with user identification information of the user equipment and the assigned IP address. In response to the request message, the wireless access point may receive predetermined multimedia contents and deliver the received predetermined multimedia contents to the user equipment based on the assigned IP address.

20 Claims, 6 Drawing Sheets

(56) References Cited

U.S. PATENT DOCUMENTS

| | | | | |
|---|---|---|---|---|
| 8,429,295 B2 * | 4/2013 | Vaswani | | G01D 4/004 709/242 |
| 9,317,086 B2 * | 4/2016 | Sellschopp | | B60L 3/12 |
| 2002/0177472 A1 * | 11/2002 | Tomoda | | H04M 1/6091 455/569.2 |
| 2003/0016636 A1 * | 1/2003 | Tari | | H04L 29/12066 370/328 |
| 2003/0103482 A1 * | 6/2003 | Van Bosch | | H04L 29/06 370/338 |
| 2005/0215200 A1 * | 9/2005 | Oesterling | | H04W 48/16 455/66.1 |
| 2006/0259580 A1 * | 11/2006 | Laberteaux | | H04L 67/06 709/217 |
| 2008/0055058 A1 * | 3/2008 | Nishiyama | | G07C 5/008 340/438 |
| 2008/0189436 A1 * | 8/2008 | Vaswani | | G01D 4/004 709/242 |
| 2008/0248749 A1 * | 10/2008 | Bahl | | H04W 52/0274 455/41.2 |
| 2009/0144150 A1 * | 6/2009 | Sakakibara | | B60L 11/123 705/14.62 |
| 2009/0184833 A1 * | 7/2009 | Tonegawa | | G01C 21/32 340/636.2 |
| 2010/0145837 A1 * | 6/2010 | Graziano | | G06Q 30/04 705/34 |
| 2010/0154008 A1 * | 6/2010 | Hicks, III | | A63F 13/12 725/62 |
| 2010/0211643 A1 * | 8/2010 | Lowenthal | | B60L 3/0046 709/206 |
| 2010/0235891 A1 * | 9/2010 | Oglesbee | | H04L 67/1095 726/5 |
| 2010/0315197 A1 * | 12/2010 | Solomon | | G06F 21/31 340/5.2 |
| 2012/0028480 A1 * | 2/2012 | Bilbrey | | H01R 13/6205 439/39 |
| 2012/0030467 A1 * | 2/2012 | Schaefer | | H04L 9/0866 713/169 |
| 2012/0047036 A1 * | 2/2012 | Allan | | B60L 11/1824 705/21 |
| 2012/0109446 A1 * | 5/2012 | Yousefi | | H04N 7/183 701/29.3 |
| 2012/0182939 A1 * | 7/2012 | Rajan | | A61B 5/0008 370/328 |
| 2013/0024306 A1 * | 1/2013 | Shah | | G06Q 20/32 705/17 |
| 2013/0080254 A1 * | 3/2013 | Thramann | | G06Q 50/06 705/14.57 |
| 2013/0163511 A1 * | 6/2013 | Waldner | | G07C 5/008 370/328 |
| 2013/0249276 A1 * | 9/2013 | Rovik | | B60L 3/12 307/9.1 |
| 2013/0311264 A1 * | 11/2013 | Solomon | | G06Q 30/0236 705/14.26 |
| 2014/0036989 A1 * | 2/2014 | Heinrich | | B60L 11/1818 375/238 |
| 2014/0058623 A1 * | 2/2014 | Kraeling | | H04L 12/40 701/34.4 |
| 2014/0142770 A1 * | 5/2014 | Sellschopp | | B60L 11/1838 700/291 |
| 2014/0211863 A1 * | 7/2014 | Katar | | B60L 3/0069 375/257 |
| 2014/0294180 A1 * | 10/2014 | Link, II | | G08G 1/205 380/270 |
| 2014/0330453 A1 * | 11/2014 | Nakagawa | | B60H 1/00428 701/2 |
| 2014/0358649 A1 * | 12/2014 | Son | | G06Q 30/02 705/14.4 |
| 2015/0264554 A1 * | 9/2015 | Addepalli | | H04W 4/046 370/328 |

FOREIGN PATENT DOCUMENTS

| | | |
|---|---|---|
| JP | 2007-200296 A | 8/2007 |
| KR | 10-2007-0091762 A | 9/2007 |
| KR | 10-2008-0002742 A | 1/2008 |
| KR | 10-2011-0004292 A | 1/2011 |
| KR | 10-2011-0101846 A | 9/2011 |
| KR | 10-1154525 B1 | 6/2012 |
| KR | 10-2012-0102462 A | 9/2012 |

* cited by examiner

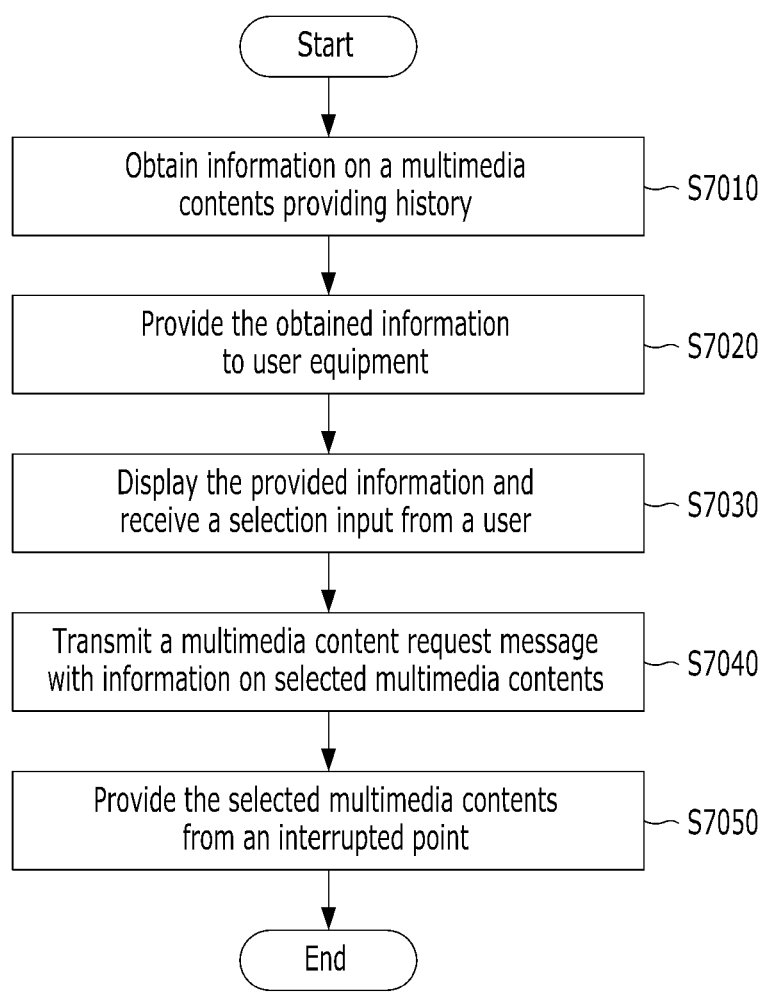

PROVIDING MULTIMEDIA CONTENTS TO USER EQUIPMENT ASSOCIATED WITH ELECTRIC VEHICLE

CROSS REFERENCE TO PRIOR APPLICATIONS

The present application claims priority under 35 U.S.C. §119 to Korean Patent Application No. 10-2013-0024862 (filed on Mar. 8, 2013), which is hereby incorporated by reference in its entirety.

BACKGROUND OF THE INVENTION

The present disclosure relates to providing multimedia contents to user equipment associated with an electric vehicle.

An electric vehicle moves by rotating its motor using electricity stored in a battery. Such electric vehicle was developed before of the development of a typical vehicle using an internal combustion engine. However, practical limitations of the electrical vehicle caused by the weight and the time required to charge its battery hindered the full commercialization of the electric vehicle. But, the environmental concerns of using the internal combustion engine have revitalized a further development of the electric vehicle.

The electric vehicle is similar to other typical vehicles with internal combustions engines except that it has an electric motor instead of a combustion engine. Unlike a typical vehicle, an important issue of the electric vehicle development is to reduce the size and the weight of the battery corresponding to its energy source. Particularly, reducing the time required to charge the battery is a critical element for the full commercialization of the electric vehicle.

For charging such a battery, an electric vehicle is hooked up to an electric charging unit and a driver of the electric vehicle waits for a comparatively long time until the electric vehicle is fully charged. During such a waiting period, various services may be provided to the driver through electronic devices mounted on the electric vehicle or a portable device of the driver.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a multimedia contents service may be provided to user equipment associated with an electric vehicle located at an electric vehicle charging station, through a wireless access point installed at the electric vehicle charging station.

In accordance with at least one embodiment, a method may be provided for providing a multimedia contents service to user equipment associated with an electric vehicle located in a first electric vehicle charging station through a wireless access point installed at the first electric vehicle charging station. The method may include allocating, by the wireless access point, an Internet Protocol (IP) address to user equipment associated with an electric vehicle located in the first electric vehicle charging station in response to a connection request message received from the user equipment, transmitting a request message to a service server with user identification information of the user equipment and the assigned IP address, and receiving predetermined multimedia contents and delivering the received predetermined multimedia contents to the user equipment based on the assigned IP address.

The allocating may include receiving the connection request message from the user equipment, obtaining the user identification information from the connection request message, and transmitting the obtained user identification information and a request message for determining whether the user equipment is associated with an electric vehicle to an associated communication service provider.

The allocating may include receiving a determination result from the associated communication service provider and allocating an IP address to the user equipment when the determination result indicates that the user equipment is registered user equipment with an electric vehicle.

The method may further include determine, by the associated communication service provider, whether the user equipment is previously registered for a service with information on an associated electric vehicle based on registration information stored in the associated communication service provider.

The allocating may include receiving a confirmation message that confirms the user equipment is registered user equipment and information on an associated vehicle information from the associated communication service provider and determining whether the user equipment is associated with an electric vehicle located in the first electric vehicle charging station. The allocating may further include receiving the connection request message from the user equipment, obtaining the user identification information from the connection request message, and transmitting the obtained user identification information and a request message for determining whether the user equipment is associated with an electric vehicle to the service server. The allocating may include receiving a determination result from the service server and allocating an IP address to the user equipment when the determination result indicates that the user equipment is associated with an electric vehicle in the first electric vehicle charging station.

The method may further include determining, by the service server, whether the user equipment is previously registered for a service with information on an associated electric vehicle based on registration information stored in the service server.

The method may further include determining, by the service server, whether the user equipment is associated with an electric vehicle coupled to at least one of electric charging units included in the first electric vehicle charging station based on the user identification information obtained from the request message and vehicle identification information obtained from the at least one of electric charging units.

The transmitting may include detecting, by the service server, an electric charging unit coupled to an electric vehicle associated with the user equipment based on the user identification information and vehicle identification information obtained from at least one of electric charging units included in the first electric vehicle charging station, requesting, by the service server, a charging operation status to the detected electric charging unit, and providing the predetermined multimedia contents to the user equipment when the service server receives a charging initiation notification message from the detected electric charging unit.

The providing may include transmitting, by the service server, a request message for the predetermined multimedia contents with the user identification information and the assigned IP address to a contents server. The contents server may transmit the predetermined multimedia contents to the user equipment based on the assigned IP address in response to the request message.

The method may further include receiving, by the service server, a charging interruption notification message from the detected electric charging unit and transmitting a charging completion message to the wireless access point and the contents server in response to the charging interruption notification message. The contents server interrupts transmitting the predetermined multimedia contents to the user equipment in response to the charging completion message and the wireless access point release a communication link to the user equipment in response to the charging completion message.

In accordance with at least one embodiment, a method may be provided for providing a multimedia contents service, by a service server, to user equipment associated with an electric vehicle located in a first electric vehicle charging station through a wireless access point installed in the first electric vehicle charging station. The method may include receiving, from the wireless access point, a request message with an assigned IP address and user identification information of user equipment transmitting a connection request message to the wireless access point and providing predetermined multimedia contents to the user equipment based on the assigned IP address when receiving a charging initiation notification message from an electric charging unit coupled to the user equipment.

The method may further include detecting an electric charging unit coupled to the user equipment based on user identification information included in the request message and vehicle identification information obtained from at least one of electric charging units included in the first electric vehicle charging station and requesting a charging operation status from the detected electric charging unit.

The providing may include transmitting a multimedia contents request message with the assigned IP address and the user identification information to a contents server when receiving a charging initiation notification message from the electric charging unit coupled to the user equipment. The contents server may transmit the predetermined multimedia contents to the user equipment based on the assigned IP address and the user identification information.

The method may include receiving a charging interruption notification message from the detected electric charging unit and transmitting a charging completion message to the wireless access point and the contents server in response to the charging interruption notification message. The contents server may interrupt transmitting the predetermined multimedia contents to the user equipment in response to the charging completion message and the wireless access point release a communication link to the user equipment in response to the charging completion message.

The method may include receiving a request message for determining whether the user equipment is associated with an electric vehicle located in the first electric vehicle charging station with user identification information of the user equipment, determining whether the user equipment is previously registered for a service with information on an associated electric vehicle based on registration information stored in the service server, and transmitting a confirmation message to allow the wireless access point to allocate an IP address to the user equipment when the user equipment is registered for the service.

The method may further include receiving a request message for determining whether the user equipment is associated with an electric vehicle located in the first electric vehicle charging station with user identification information of the user equipment, determining whether the user equipment is associated with an electric vehicle coupled to at least one of electric charging units included in the first electric vehicle charging station based on the user identification information obtained from the request message and vehicle identification information obtained from the at least one of electric charging units, and transmitting a confirmation message to allow the wireless access point to allocate an IP address to the user equipment when the user equipment is associated with an electric vehicle coupled to one of the electric charging unit based on the user identification information and the vehicle identification information.

The method may further include obtaining a multimedia contents providing history associated with the user equipment after establishing a communication link to the user equipment based on the assigned IP address and providing the obtained multimedia contents providing history to the user equipment. The multimedia contents providing history may include information on previously provided multimedia contents, a name of each provided multimedia content, a time of providing each multimedia content, and an interrupted point of each provided multimedia content.

The method may further include receiving information on a selected multimedia content from the user equipment and transmitting a multimedia contents request message to a contents server with information on the selected multimedia contents and an associated interrupted point. The contents server may transmit the selected multimedia contents from the associated interrupted point.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 7 illustrates providing multimedia contents from an interrupted point to an electric vehicle in accordance with at least one embodiment.

DETAILED DESCRIPTION OF THE INVENTION

Figure 1:
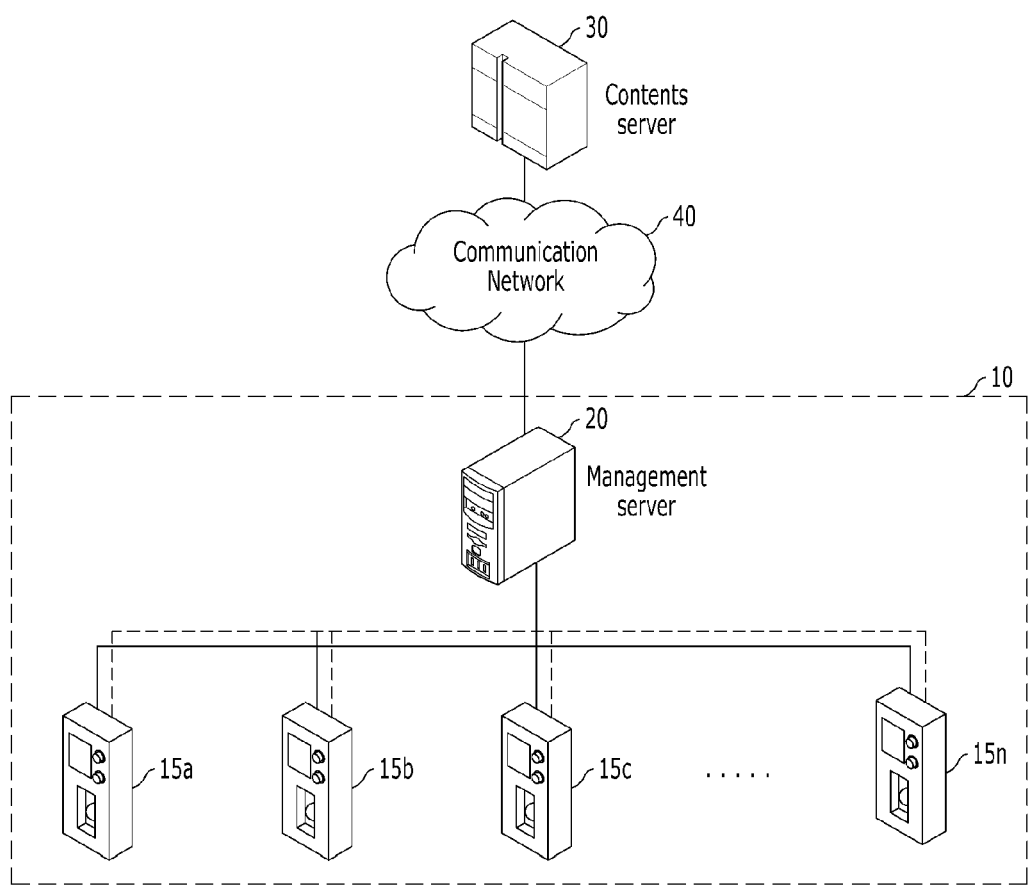
FIG. 1 illustrates an electric charging station for providing a multimedia contents service to an electric vehicle.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a multimedia contents service may be provided to user equipment associated with an electric vehicle coupled to one of electric charging units in an electric vehicle charging station. A wireless access point may be installed in the electric vehicle charging station and assigns an IP address to user equipment when the user equipment is associated with an electric vehicle located in an electric vehicle charging station. The multimedia contents service may be provided through the assigned Internet protocol (IP) address. Before describing at least one embodiment of the present disclosure, a related technology for a multimedia content service will be discussed briefly with reference to FIG. 1.

FIG. 1 illustrates an electric charging station for providing a multimedia contents service to an electric vehicle.

Referring to FIG. 1, an electric vehicle charging station may be a station for supplying electric energy for the recharging of plug-in electric vehicles. For example, typical electric vehicle charging station 10 may supply electric energy to an electric vehicle coupled to an electric charging unit. Such electric vehicle charging station 10 may include a plurality of electric charging units (e.g., electric vehicle changing unit 15) and management server 20. Electric charging unit 15 may be coupled to an electric vehicle through a physical cable (e.g., electric wire) and supply electric energy to the electric vehicle through the physical cable in response to control of management server 20. The physical cable may be used to transmit signals (e.g., multimedia contents) to and receive signals (e.g., status information) from the electric energy as well as supplying electric energy to an electric vehicle. Management server 20 may be a computing system for monitoring and managing a plurality of corresponding electric charging units and electric vehicles coupled to the electric charging units.

Particularly, management server 20 may be connected to electric charging unit 15 and provide predetermined contents to an electric vehicle hooked up to electric charging unit 15 through the physical cable connected between electric charging unit 15 and the electric vehicle while electric charging unit 15 supplies electric energy to the electric vehicle. The predetermined multimedia contents may include text message for charging status, News, advertisements, movies, TV shows, and so forth. The predetermined multimedia contents may be played back through an output device (e.g., a display and a speaker) mounted on an electric vehicle. Such a multimedia contents service may entertain customers (e.g., drivers and passengers of electric vehicles) while waiting for finishing charging an electric vehicle.

In order to provide such multimedia contents, electric vehicle charging station 10 requires having management server 20 physically installed in electric vehicle charging station 10. Management server 20 may be coupled to contents server 30 through a communication network. Such requirements may increase a cost of building and maintaining each electric vehicle charging station 10. Furthermore, since multimedia contents are provided to a device mounted on corresponding electric vehicle, customers have to stay inside an electric vehicle to watch the received multimedia contents.

Each electric vehicle charging station 10 includes independent management server 20 not coupled with others through a communication network. Furthermore, management server 20 installed at one company's electric vehicle charging station may be not compatible with other servers installed at the other company's electric vehicle charging stations. Accordingly, it may be not an efficient way of managing stations and customers. For example, it could be more efficient to attract future customers if advertisement contents are selected and provided to a customer based on a customer's history of watching multimedia contents provided from management server 20. Typical electric vehicle charging station 10 may not efficiently collect and manage such information of customers with other electric charging stations. Furthermore, a customer might leave one electric vehicle charging station in the middle of watching a streaming content of a movie when an electric vehicle is completely charged. If the customer visits another electric vehicle charging station and wants to continuously watch the movie, the customer may have to start over or personally find a place where the customer left off.

In accordance with at least one embodiment, a multimedia contents service may be provided to user equipment associated with an electric vehicle located at an electric vehicle charging station through a wireless access point installed at the electric vehicle charging station in connection with a service server installed at a remote location in a distance from the wireless access point. Hereinafter, an electric vehicle charging station in accordance with at least one embodiment will be described with reference to FIG. 2.

Figure 2:
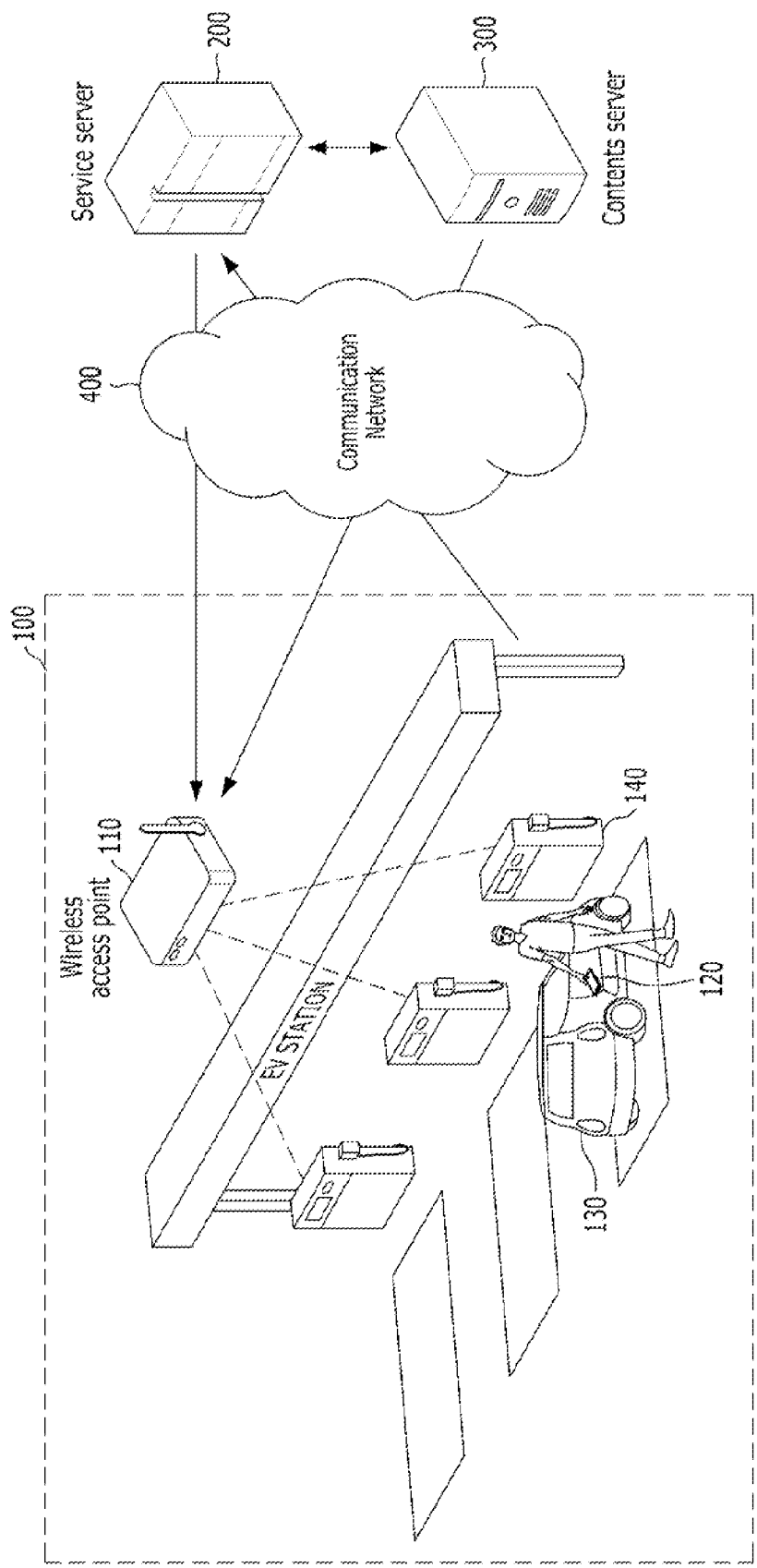
FIG. 2 illustrates an electric vehicle charging station for providing a multimedia contents service to user equipment associated with an electric vehicle in accordance with at least one embodiment.

FIG. 2 illustrates an electric vehicle charging station for providing a multimedia contents service to user equipment associated with an electric vehicle in accordance with at least one embodiment.

Referring to FIG. 2, electric vehicle charging station 100 may include wireless access point 110 and a plurality of electric charging units (e.g., electric charging unit 140). Wireless access point 110 may be installed at electric vehicle charging station 100. Wireless access point 110 may be coupled to a plurality of electric charging units through a wired and/or wireless communication link, but the present invention is not limited thereto. Furthermore, wireless access point 110 may be coupled to service server 200 in a remote location from electric vehicle charging station 100 through commination network 400. Wireless access point 110 may be coupled to contents server 300 through communication network 400. Each electric charging unit may be coupled to service server 200 and contents server 300 through communication network 400 directly or indirectly through wireless access point 110. In accordance with at least one embodiment, a multimedia contents service may be provided user equipment associated with an electric vehicle entered into electric vehicle charging station 100 or approached to electric vehicle charging station 100 within a predetermined distance through assigning an Internet Protocol (IP) address to user equipment 120 using access point 110.

Each electric charging unit (e.g., electric charging unit 140) includes a physical cable hooked up to electric vehicle 130 and supplies electric power to electric vehicle 130 through the physical cable. Through such a physical cable, electric charging unit 140 may transmit signals to and receive signals from electric vehicle 130. Through exchanging the signals, electric charging unit 140 may collect information on electric vehicle 130 such as status information and vehicle identification information of electric vehicle 130. After collecting such information, electric charging unit 140 may provide the collected information to service server 200.

For example, electric charging unit 140 may collect vehicle identification information on electric vehicle 130 when electric vehicle 130 is connected to electric charging unit 140 for charging. The vehicle identification information may include a vehicle identification number, a type of vehicle, and a license plate number of electric vehicle 130. Electric charging unit 140 may send the vehicle identification information to service server 200.

Once electric charging unit 140 begins charging electric vehicle 130, electric charging unit 140 may collect status information from electric vehicle 130 and provide such collected status information to service server 200. For example, electric charging unit 140 may transmit a charging initiation notification message to service server 200 for notifying the start of a charging operation. When electric charging unit 140 finishes charging electric vehicle 130, electric charging unit 140 may transmit a charging interruption notification message to service server 200 for notifying the interruption of the charging operation.

In accordance with at least one embodiment, when electric vehicle 130 enters in a predetermined zone of electric vehicle charging station 100 or approaches electric vehicle charging station 100 within a predetermined distance, user equipment (e.g., user equipment 120) of a driver or at least one of passengers of electric vehicle 130 may transmit a connection request message. The transmission of such a connection request message may be invoked by a predetermined application installed and executed in user equipment 120 upon the generation of a predetermined event. Such a predetermined event may include entering a predetermined zone defined in electric vehicle charging station 100 or activating the predetermined application installed in user equipment 130 in response to a user input.

User equipment 120 may be an electric device capable of communication with other entities, processing power, and a memory. User equipment 120 may be a portable device carried by a driver or at least one passenger of electric vehicle 130 or mounted on electric vehicle 130. For example, user equipment 120 may include a smartphone, a personal digital assistant (PDA), a pad-like device, a laptop computer, and a tablet personal computer. Furthermore, user equipment 120 may include a navigation device and an entertainment device, which are mounted on electric vehicle 130.

Such user equipment 120 may transmit a connection request message to wireless access point 120 when electric vehicle 130 enters a predetermined zone of electric vehicle charging station 100 or approaches electric vehicle charging station 100 within a predetermined distance.

Wireless access point 120 may be a device that allows wireless devices including user equipment 120 to connect to a wired network using various types of communication schemes. In accordance with at least one embodiment, wireless access point 120 may be provided by a service provider for at least one of an electric vehicle charging service, a communication service and a multimedia contents service. Such wireless access point 120 may connect user equipment 120 to service server 200 through communication network 400.

For example, in response to the connection request message, wireless access point 120 may require user equipment 120 to transmit identification information. User equipment 120 may send the requested identification information including a user equipment identification number, an assigned phone number, associated electric vehicle identification information, and/or a media access control address (MAC address) to wireless access point 120, but the present invention is not limited thereto. User equipment 120 may transmit information necessary for identifying user equipment 120 and associated electric vehicle 130.

Based on the received identification information of user equipment 120, wireless access point 110 may perform an authentication process in connection with service server 200. For example, wireless access point 110 may request service server 200 to confirm whether user equipment 120 is associated with electric vehicle 130 coupled to electric vehicle charging station 100 where user equipment 120 is located in. Upon the receipt of a confirmation message from service server 200, wireless access point 110 may assign an IP address to user equipment 120.

Service server 200 may be a computing system of at least one of an electric vehicle charging service provider, a communication service provider, and a multimedia contents service provider. In accordance with at least one embodiment, service server 200 may be installed at a remote location from wireless access point 110 and provide a multimedia contents service to user equipment and electric vehicles. Furthermore service server 200 may be coupled to a plurality of wireless access points each installed at different electric vehicle charging stations and manage the plurality of wireless access points. For example, service server 200 may receive information on user equipment 120 and associated electric vehicle 130 from wireless access point 110 and manage the received information. Service server 200 may use such stored information to manage user equipment 120 and associated electric vehicle 130. Particularly, service server 200 may use the stored information to confirm whether user equipment 120 sending a connection request message is associated with electric vehicle 130 being charged at electric vehicle charging station 100. Furthermore, service server 200 may receive status information of electric vehicles and manage registered electric vehicles to efficiently provide a related service to electric vehicles.

Service server 200 may store information necessary for providing a multimedia contents service to registered user equipment and electric vehicles. For example, service server 200 may store various multimedia contents such as text messages, advertisements, movies, games, information related for shopping, finance, and a trip. Service server 200 may store and provide a dedicated application for the multimedia contents service or for an electric vehicle charging service. The present invention, however, is not limited thereto. Service server 200 may be coupled to contents server 300 and obtains contents requested by user equipment 120 from contents server 300.

Contents server 300 may be a separate computing system that stores various multimedia contents. Contents server 300 may provide multimedia contents directly to user equipment 120 in addition to multimedia contents provided by service server 200 or receives a request message for requesting predetermined multimedia contents from service server 200 and provide the requested multimedia contents to service server 200. That is, contents server 300 may be connected to service server 200 and perform operations in cooperation with service server 200 to provide multimedia contents to user equipment 120.

In accordance with at least one embodiment, user equipment 120 may send a connection request message to wireless access point 120 upon the generation of a predetermined event, for example, entering a predetermined zone of electric vehicle charging station 100 or coupling to electric charging unit 140. The connection request message my include user identification information of user equipment 120. Wireless access point 110 may receive the connection request message with the user identification information and transmit the received user identification information to service server 200 with a request message for confirming whether user equipment 120 is associated with electric vehicle 130 located in electric vehicle charging station 100 or hooked up to electric charging unit 140.

Electric charging unit 140 may collect vehicle identification information and status information from electric vehicle 130 upon the generation of predetermined events. The predetermined events may include entering of electric vehicle 130 into a predetermined zone defined by electric charging unit 140 or coupling of electric vehicle 130 with electric charging unit 140. Such collection may be performed through a wireless communication link established between electric charging unit 140 and electric vehicle 130 or a physical cable connected between electric charging unit 140 and electric vehicle 130.

After collecting the vehicle identification information and the status information, electric charging unit 140 may transmit the collected information to service server 200. Service server 200 may determine whether user equipment 120 is associated with electric vehicle 130 being charged based on the user identification information received from wireless access point 120 and the vehicle identification information received from electric charging unit 140.

Service server 200 may map the received vehicle identification information with associated user identification information received from wireless access point 110 and manage the received vehicle identification information in connection with associated user identification information based on a mapping table. For example, service server 200 may use such mapping information obtained from previous operations for a multimedia contents service in order to confirm user equipment 120 is associated with electric vehicle 130.

After performing such a confirmation process, service server 200 may transmit a notification message to wireless access point 120. After transmitting the notification message, service server 200 may map the user identification information and the associated vehicle identification information and store and manage the user identification information in connection with the associated vehicle identification information.

Once service server 200 notifies that user equipment 120 is associated with electric vehicle 130, wireless access point 110 may assign an IP address to user equipment 120. Upon the receipt of a charging initiation notification message from electric charging unit 140 that an electric charging operation has started, service server 200 may start providing predetermined multimedia contents to the assigned IP address. Service server 200 may relay other multimedia contents stored in contents server 300 to the assigned IP address as well. When services server 200 receives a charging interruption notification message from electric charging unit 140 that the electric charging operation has finished, service server 200 may stop providing the multimedia contents to the assigned IP address.

Service server 200 was described as receiving user identification information from wireless access point 110 and vehicle identification information from electric charging unit 140 and determining whether user equipment 120 is associated with electric vehicle 130, but the present invention is not limited thereto. Such operation may be performed by an associated communication service provider. The associated communication service provider may denote a computing system that provides a communication service to user equipment 100 and wireless access point 110.

For example, the associated wireless communication service provider may receive the user identification information with a confirmation request message from wireless access point 110. The associated wireless communication service provider may have information on user equipment 120 and associated electric vehicle 130 from a previous registration process or a previous operation for providing a related service including a multimedia contents service. The information from the previous registration process or from the previous service may include a user equipment identification number, a phone number assigned to user equipment 120, a media access control (MAC) address of user equipment 120, a vehicle identification number, of an associated electric vehicle a type of vehicle, and/or a license plate number of electric vehicle 130. The wireless communication service provider may determine whether user equipment 120 is associated with electric vehicle 130 based on such previous information. The wireless communication service provider may transmit a confirmation message to wireless access point 120. When the wireless communication provider does not have any information related to user equipment 120 and associated electric vehicle 130, the wireless communication service provider may map the user identification information and the associated vehicle identification information and store and manages the user identification information in connection with the associated vehicle identification information.

When the wireless communication service provider notifies that user equipment 120 is associated with electric vehicle 130, wireless access point 110 may assign an IP address to user equipment 120. Service server 200 may start providing predetermined multimedia contents to the assigned IP address depending on whether a charging status of electric vehicle 130.

In another embodiment, user equipment 120 may be prompted to provide information on an associated electric vehicle, such as vehicle identification information. When user equipment 120 is connected with wireless access point 110 for the first time, user equipment 120 may be prompted to provide vehicle identification information on associated electric vehicle 130. The vehicle identification information may be transmitted to at least one of the wireless communication service provider and service server 200. Alternatively, wireless access point 120 may store the user identification information and the associated vehicle identification information in a memory thereof.

In another embodiment, user equipment 120 may be a device mounted in electric vehicle 130. For example, user equipment 120 may be a navigation device, a DVD player, and/or an entertainment device. In this case, user equipment 120 may directly send the user identification information and the vehicle identification information to wireless access point 120 and/or service server 200.

As described above, wireless access point 110 may assign an IP address to user equipment 120 in response to a connection request message from user equipment 120 and relay multimedia contents from service server 200 or from contents server 300 to user equipment 120 in accordance with at least one embodiment. Hereinafter, wireless access point 110 will be described with reference to FIG. 3.

Figure 3:
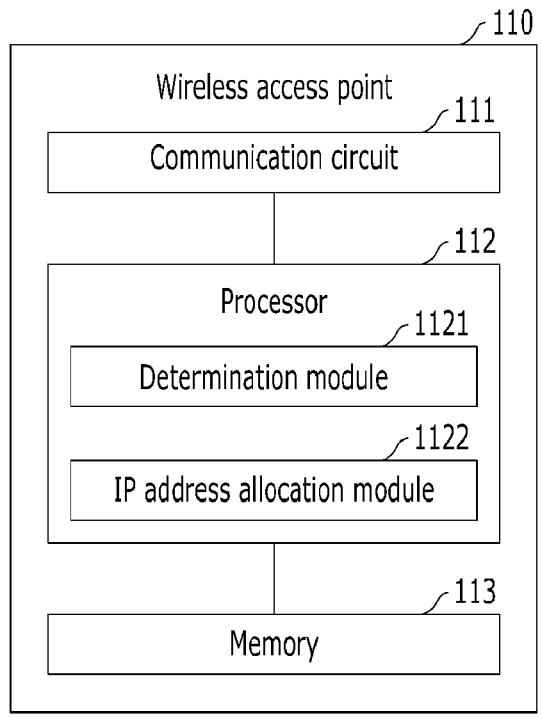
FIG. 3 illustrates a wireless access point in accordance with at least one embodiment.

FIG. 3 illustrates a wireless access point in accordance with at least one embodiment.

Referring to FIG. 3, wireless access point 120 may connect user equipment 120 to communication network 400 using various types of communication schemes. In accordance with at least one embodiment, wireless access point 120 may be provided by a service provider for at least one of an electric vehicle charging service, a communication service and a multimedia contents service, but the present invention is not limited thereto. Wireless access point 110 may include communication circuit 111, processor 112, and memory 113. Processor 112 may include determination module 1121 and IP address allocation module 1122.

Communication circuit 111 may establish a communication link to at least one of user terminal 120, service server 200, and contents server 300. Communication circuit 111 may establish electric charging units, but the present invention is not limited thereto. Through the established communication link, communication circuit 111 may receive signals from or transmit a signal to at least one of user terminal 120, service server 200, and contents server 300. Furthermore, communication circuit 111 may establish a communication link between user terminal 120 and service server 200, between user terminal 120 and contents server 300, or between an electric charging unit and service server 200. Through the established communication link, communication circuit 111 may relay signals between user terminal 120 and service server 200, between user terminal 120 and contents server 300, and between an electric charging unit and service server 200. Communication circuit 111 may perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (WiMAX), or a mobile communication network based on CDMA/WCDMA or GSM/GPRS.

Processor 112 may control overall operation of the constituent elements of wireless access point 110. In accordance with at least one embodiment, processor 112 may perform operations for assigning an IP address to user equipment 120 associated with electric vehicle 130 entering to a predetermined zone of electric vehicle charging station 100. Processor 112 may include determination module 1121 and IP address allocation module 1122.

Determination module 1121 may perform operation for determining whether user equipment 120 is associated with electric vehicle 130 located in electric vehicle charging station 100 based on user identification information of user equipment 120. The user identification information may be at least one of a MAC address, an identification number, and a phone number. For example, determination module 1121 may obtain user identification information of user equipment 120 through communication circuit 111. Determination module 1121 may transmit the obtained user identification information to an associated wireless communication service provider and request the associated wireless communication service provider to determine whether user equipment 120 is registered user equipment. Furthermore, determination module 112 may request associated electric vehicle information from the associated wireless communication service provider. Based on the determination result and the electric vehicle information, determination module 1121 may determine whether an IP address is allocated to user equipment 120.

Furthermore, determination module 1121 may transmit the obtained user identification information to service server 200 and request service server 200 to determine whether user equipment 120 is associated with electric vehicle 130 located in electric vehicle charging station 100. Based on the determination result from service server 200, determination module 1121 may decide whether an IP address is allocated to user equipment 120. In addition, determination module 1121 may request user equipment 120 to input information on an associated electric vehicle and use the electric vehicle information from user equipment 120 to determine whether user equipment 120 is associated with an electric vehicle located in electric vehicle charging station 100.

IP address allocation module 1122 may assign an IP address to user equipment 120 based on the determination result of determination module 1121. For example, when determination module 1121 determines that user equipment 120 is associated with electric vehicle 130 in charging station 100, IP address allocation module 1122 assigns an IP address to user equipment 120 and establishes a communication link to user equipment 120. Such operation of processor 112 will be described in detail with reference to FIG. 5, FIG. 6 and FIG. 7.

Memory 113 may be data storage storing information necessary for driving wireless access point 110 and performing certain operation upon generation of a predetermined event. Such information may include any software programs and related data. Memory 113 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. In accordance with at least one embodiment memory 113 may store user identification information of user equipment and vehicle identification information. The user identification information may include a MAC address, an identification number, and a phone number. The vehicle identification information may include a vehicle identification number, a type of vehicle, and a license plate number of electric vehicle 130.

Figure 4:
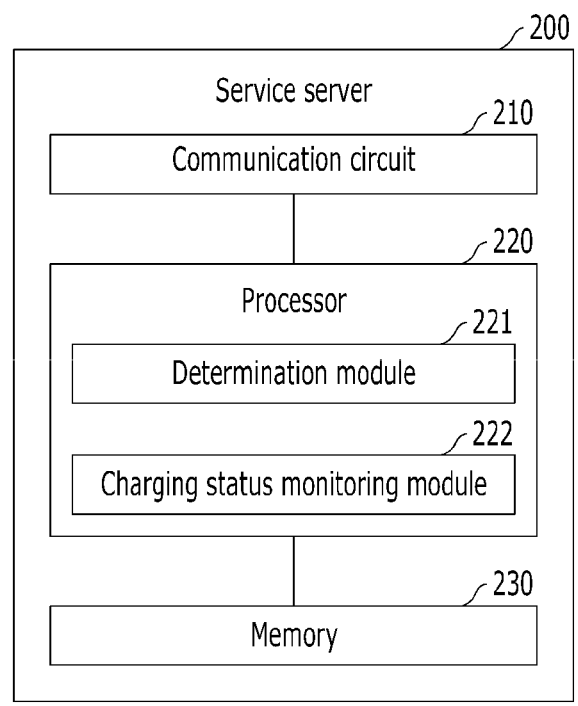
FIG. 4 illustrates s service server in accordance with at least one embodiment.

FIG. 4 illustrates s service server in accordance with at least one embodiment.

Referring to FIG. 4, service server 200 may be a computing system for providing a multimedia contents service to user equipment associated with an electric vehicle. Such service server 200 may be a server of at least one of an electric vehicle charging service provider, a communication service provider, and a multimedia contents service provider. Service server 200 may include communication circuit 210, processor 220 and memory 230.

Communication circuit 210 may establish a communication link to at least one of user terminal 120 and contents server 300 through communication network 400. Communication circuit 210 may establish a communication link to electric charging units, but the present invention is not limited thereto. Through the established communication link, communication circuit 210 may receive signals from or transmit a signal to at least one of user terminal 120, electric charging unit 140, and contents server 300. Communication circuit 210 may perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (WiMAX), or a mobile communication network based on CDMA/WCDMA or GSM/GPRS.

Processor 220 may control overall operation of the constituent elements of service server 200. In accordance with at least one embodiment, processor 220 may include determination module 221 and charging status monitoring module 222. Determination module 221 may perform operation for determining whether user equipment 120 is associated with an electric vehicle located in electric vehicle charging station 100 in response to a request message from wireless access point 110. For example, determination module 221 may map an assigned IP address with associated electric vehicle information such as a vehicle identification number or a vehicle license plate number. It is necessary because wireless access point 110 may assign a variable IP address to user equipment. Determination module 221 may have information on registered user equipment (e.g., user identification information) and associated electric vehicle information when user equipment is registered for a related service. Determination module 221 may use such stored information on registered user equipment to determine whether user equipment transmitting a connection request message is associated with an electric vehicle located in electric vehicle charging station 100.

When determination module 221 determines that such user equipment is associated with an electric vehicle in electric vehicle charging station 100, determination module 221 transmits a confirmation message to allow wireless access point 110 to assign an IP address to the user equipment. Such operation of determination module 221 will be described in detail with reference to FIG. 5, FIG. 6, and FIG. 7.

Charging status monitoring module 222 may collect information on a status of a charging operation of an electric vehicle from an electric charging unit of electric vehicle charging station 100. For example, charging status monitoring module 222 may collect vehicle identification information of an electric vehicle starting a charging operation or an electric vehicle interrupting a charging operation. Furthermore, charging status monitoring module 222 may collect supplementary information of a charging operation, such as a charging amount and a charging date and time.

Memory 230 may be data storage storing information necessary for driving service server 200 and performing certain operation upon generation of a predetermined event. Such information may include any software programs and related data. Memory 230 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. Memory 230 may store information on user equipment and an associated electric vehicle. Memory 230 may further store a charging history of each electric vehicle and a multimedia contents providing history of each user equipment.

Figure 5:
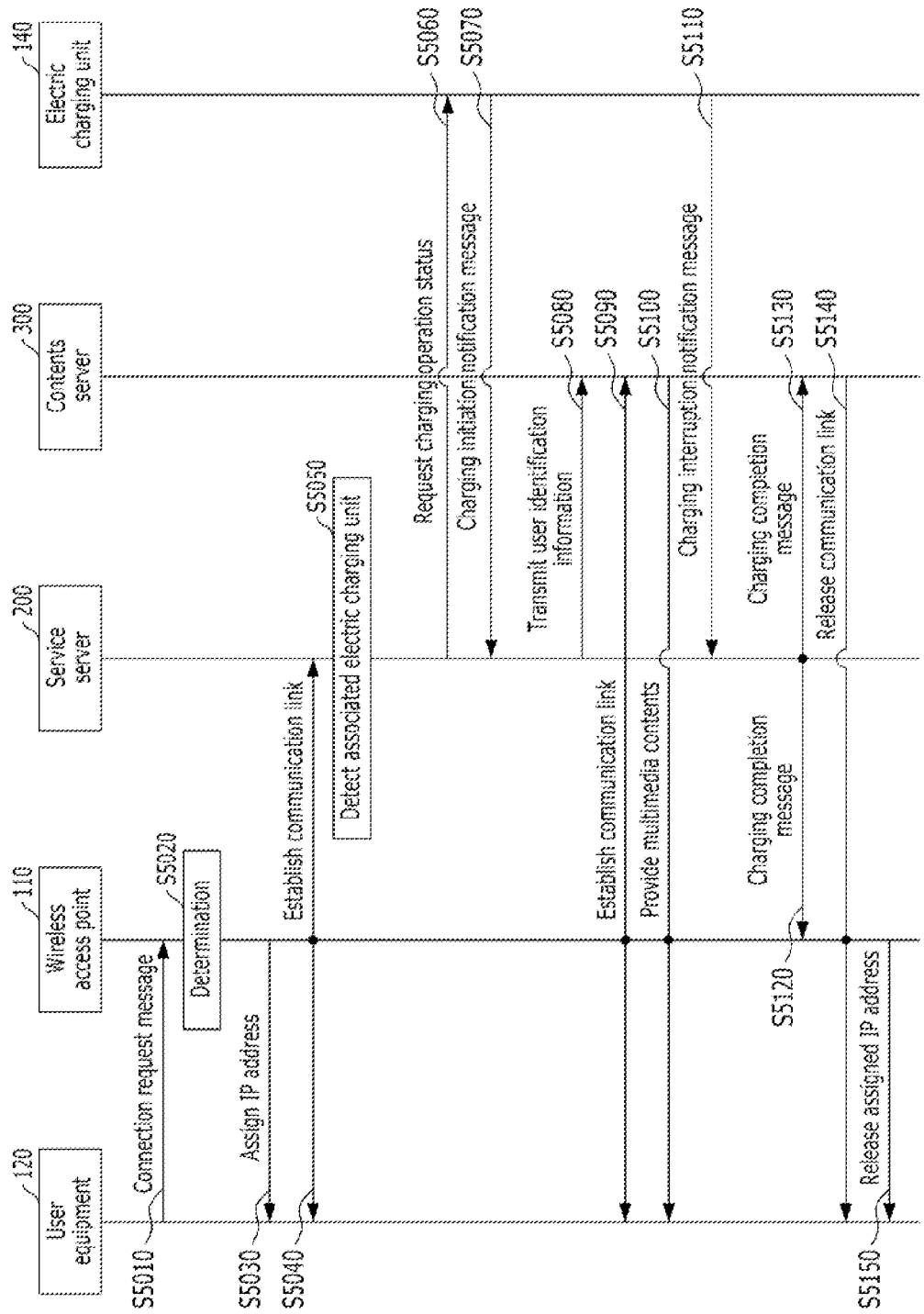
FIG. 5 illustrates providing a multimedia contents service to user equipment associated with an electric vehicle in accordance with at least one embodiment.

FIG. 5 illustrates providing a multimedia contents service to user equipment associated with an electric vehicle in accordance with at least one embodiment.

At step S5010, wireless access point 110 may receive a connection request message from user equipment 120. Such a connection request message may be generated and transmitted when an electric vehicle associated with user equipment 120 enters into or approaches electric vehicle charging station 100 within a predetermined distance. Alternatively, the connection request message may be generated and transmitted by executing a predetermined application installed in user equipment 120 in response to a user input. Wireless access point 110 may receive user identification information with the connection request message. The user identification information may include a user equipment identification number, a phone number assigned to user equipment 120, and/or a media access control address (MAC address) assigned to user equipment 120.

At step S5020, wireless access point 110 may determine whether user equipment 120 transmitting the connection request message is associated with an electric vehicle (e.g., electric vehicle 130) located in electric vehicle charging station 100. Wireless access point 110 may use the user identification information included in the connection request message for determination.

In accordance with at least one embodiment, wireless access point 110 may transmit the user identification information to an associated wireless communication service provider and request vehicle identification information associated with the user identification information to the associated wireless communication service provider. In this case, the wireless communication service provider may determine whether user equipment 120 is registered user equipment based on the user identification information. When user equipment 120 is registered user equipment, the wireless communication service provider may provide associated vehicle identification information to wireless access point 110. The wireless communication service provider may possess information on user equipment 120 and electric vehicle 130 associated with user equipment 120. Such information may have been obtained from a user registration process of user equipment 120. A user of user equipment 120 may have provided the associated vehicle identification information to the wireless communication service provider, previously. The information may include a user equipment identification number, a phone number assigned to user equipment 120, a MAC address, a vehicle identification number, a type of vehicle, and/or a license plate number of electric vehicle 130.

The wireless communication service provider may confirm that user equipment 120 is registered to receive the wireless communication service based on the user identification information. In this case, the wireless communication service provider may send the confirmation message with associated information on user equipment 120 and associated electric vehicle information to wireless access point 110. Wireless access point 110 may determine whether user equipment 120 is associated with electric vehicle 130 based on the information received from the wireless communication service provider. Once wireless access point 110 determines that user equipment 120 is associated with electric vehicle 130 located at electric vehicle charging station 100, wireless access point 110 may assign an IP address to user equipment 120.

When wireless access point 110 cannot determined whether user equipment 120 is associated with electric vehicle 130 based on the received information from the associated wireless communication service provider, wireless access point 110 may transmit the user identification information to service server 200 and request service server 200 to determine whether user equipment 120 is associated with electric vehicle 130 located at electric vehicle charging station 100. In this case, service server 200 may receive the user identification information with a request message from wireless access point 110, receive the vehicle identification information from electric charging unit 140, and determine whether user equipment 120 is associated with electric vehicle 130 based on the received user identification information and the received vehicle identification information. Such operation of service server 200 will be described in detail with reference to FIG. 6.

At step S5030, wireless access point 110 may assign an IP address to user equipment 120 when wireless access point 110 determines that user equipment 120 is associated with electric vehicle 130. When wireless access point 110 determines that user equipment 120 is not associated with any electric vehicle located in electric vehicle charging station 100, wireless access point 110 may transmit an error message to user equipment 120.

At step 5040, user equipment 120 may be connected to service server 200 through wireless access point 110 based on the assigned IP address. For example, wireless access point 110 may transmits a service request message to service server 200 with user identification information and the assigned IP address of user equipment 120. In response to the service request message, service server 200 may establish a connection with user equipment 120 through the assigned IP address.

At step S5050, service server 200 may detect an electric charging unit associated with user equipment 120 and electric vehicle 130. For example, service server 200 may receive vehicle identification information from electric charging units of electric vehicle charging station 100, detect one of the electric charging units coupled to electric vehicle 130 associated with user equipment 120, and map the detected electric charging unit (e.g., electric charging unit 140) with the IP address assigned to user equipment 120. Service server 200 may provide predetermined multimedia contents to the assigned IP address depending on a charging status of electric vehicle 130.

At step S5060, service server 200 may request a charging operation status of electric vehicle 130 to detected electric charging unit 140. For example, predetermined multimedia contents may be provided to the assigned IP address when associated electric vehicle 130 is a charging status. The charging status of electric vehicle 130 may denote a status of electric vehicle 130 coupled to electric charging unit 140 and supplied with electric energy from electric charging unit 140. Accordingly, service server 200 may request the charging status of electric vehicle 130 to electric charging unit 140 before providing predetermined multimedia contents to the assigned IP address (e.g., user equipment 120).

At step S5070, service server 200 may receive a charging initiation notification message from electric charging unit 140. For example, when electric charging unit 140 starts supplying electric energy to electric vehicle 130, electric charging unit 140 transmits a charging initiation notification message to service server 200 to inform that the charging operation has started.

At step 5080, service server 200 may transmit information on user equipment 120 to contents server 300 upon the receipt of the notification message from electric charging unit 140. At step S5090, contents server 300 may establish a communication link to user equipment 120 based on the assigned IP address through wireless access point 110. At step S5100, contents server 300 may provide predetermined multimedia contents to user equipment 120 through wireless access point 110 based on the assigned IP address of user equipment 120.

In accordance with at least one embodiment, contents server 300 may provide information on available multimedia contents to user equipment 120. Based on the provided information, user equipment 120 may select at least one of available multimedia contents in response to a user input and request the selected multimedia contents to contents server 300. In response to such request, contents server 300 provides the selected multimedia contents to user equipment 120. Such operation may be performed through an application for a multimedia contents service, which is installed and executed in user equipment 120. Such an application may produce and display a graphic user interface for displaying the received information on available multimedia contents, for enabling an associated user to selected at least one of the displayed available multimedia contents, and for displaying the selected multimedia contents. Furthermore, such an application may produce and display a graphic user interface for displaying information on a charging status of an associated electric vehicle.

Contents server 300 was described as providing multimedia contents to user equipment 120 through wireless access point 110, but the present invention is not limited thereto. For example, service server 200 may include a database storing various multimedia contents and provide such multimedia contents to user equipment 120 through wireless access point 110. Furthermore, contents server 300 may be included in service server 200 as a subsystem.

At step 5110, electric charging unit 140 may transmit a charging interruption notification message to service server 200 when a charging operation is interrupted. Such interruption may be initiated when electric vehicle 130 is completely charged or when electric vehicle 130 is disconnected from electric charging unit 140.

At steps S5120 and S5130, service server 200 may transmit a charging completion message to contents server 300 and to wireless access point 110 in order to interrupt providing the predetermined multimedia contents to user equipment 120 through wireless access point 110.

At step S5140, contents server 300 may release the communication link to user equipment 120 and transmit a notification message to user equipment 120 through wireless access point 110 in response to the charging completion message. At step S5150, wireless access point 110 may also transmit a notification message to user equipment 120 and release the assigned IP address of user equipment 120.

In accordance with at least one embodiment, contents server 300 may store a multimedia contents providing history of the multimedia contents provided to user equipment 120. The multimedia contents providing history may include a type of the multimedia content, a name of the multimedia content, a time of providing the multimedia content, a destination IP address, and an interrupted point of the multimedia content. Contents server 300 may send the multimedia contents providing history to service server 200 or store the multimedia contents providing history in connection with at least one of the user identification information of user equipment 120 and the vehicle identification information of electric vehicle 130 associated with user equipment 120. Service server 200 may store the multimedia contents providing history in connection with at least one of the user identification information of user equipment 120 and the vehicle identification information of electric vehicle 130 associated with user equipment 120. Such multimedia contents providing history may be used to continuously provide the interrupted multimedia contests to user equipment 120 from the interrupted point when user equipment 120 is connected to service server 200 again. Such operation will be further described in detail with reference to FIG. 7.

As described above, service server 200 may determine whether user equipment 120 is associated with electric vehicle 130 located at electric vehicle charging station 100 or coupled to electric charging unit 140 based on user identification information received from wireless access point 110. Hereinafter, such operation will be described with reference to FIG. 6.

Figure 6:
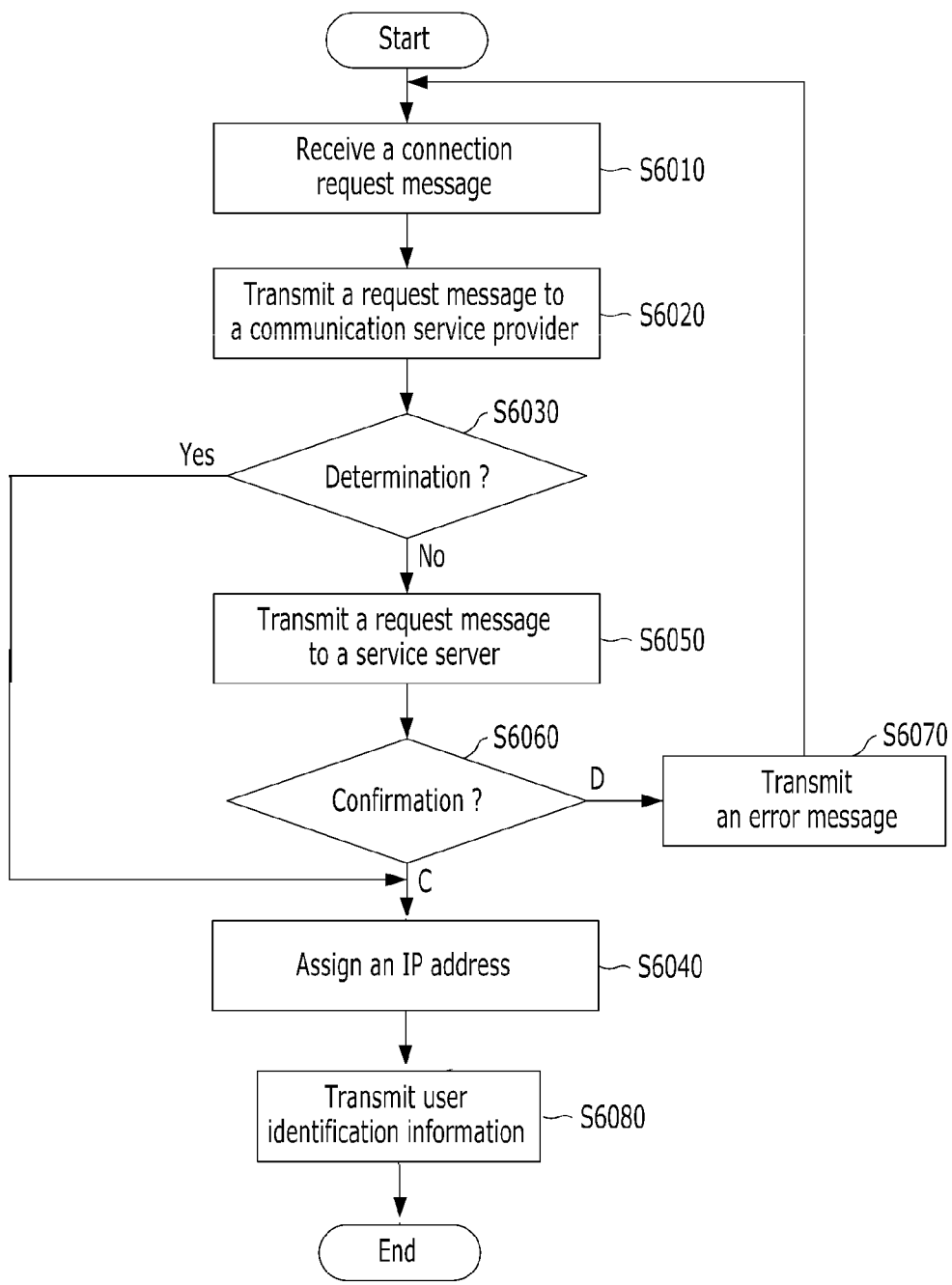
FIG. 6 illustrates assigning an IP address to user equipment in accordance with at least one embodiment.

FIG. 6 illustrates assigning an IP address to user equipment in accordance with at least one embodiment.

At step S6010, wireless access point 110 may receive a connection request message from user equipment 120. Wireless access point 110 may receive user identification information with the connection request message. The user identification information may include a user equipment identification number, a phone number assigned to user equipment 120, and/or a media access control address (MAC address).

At step S6020, wireless access point 110 may transmit the user identification information to an associated wireless communication service provider and request vehicle identification information associated with the user identification information to the associated wireless communication service provider. In this case, the wireless communication service provider may determine whether user equipment 120 is registered user equipment based on the user identification information. When user equipment 120 is registered user equipment, the wireless communication service provider may provide associated vehicle identification information to wireless access point 110. The wireless communication service provider may possess information on user equipment 120 and electric vehicle 130 associated with user equipment 120. Such information may have been obtained from a user registration process of user equipment 120. A user of user equipment 120 may have provided the associated vehicle identification information to the wireless communication service provider, previously. The information may include a user equipment identification number, a phone number assigned to user equipment 120, a MAC address, a vehicle identification number, a type of vehicle, and/or a license plate number of electric vehicle 130.

In accordance with another embodiment, the wireless communication service provider may determine whether user equipment 120 is associated an electric vehicle based on information previously stored in a database of the wireless communication service provider. In this case, the wireless communication service provider may transmit the determination result to wireless access point 110 without sending the associated electric vehicle information.

At step 6030, wireless access point 110 determine whether user equipment 120 is associated with an electric vehicle located at electric vehicle charging station 100 or coupled to one of electric charging units of electric vehicle charging station 100 based on the received information from the associated wireless communication service provider and the user identification information included in the connection request message from user equipment 120. Alternatively, the wireless communication service provide is not able to determine whether user equipment 120 is associated with an electric vehicle or to transmit associated vehicle information to wireless access point 110. In this case, wireless access point 110 may receive, from the wireless communication service provider, a message indicating unable to determine or unable to transmit associated vehicle information.

When wireless access point 110 determines whether user equipment 120 is associated with electric vehicle 130 (Yes-S6030), may assign an IP address to user equipment 120 at step S6040 and wireless access point 110 may transmit a service request message to service server 200 with at least one of the user identification information and the vehicle identification information at step S6080.

When wireless access point 110 is not able to determine based on the received information from the associated wireless communication service provider (No-S6030), wireless access point 110 may transmit a determination request message with the user identification information to service server 200 to request service server 200 to determine whether user equipment 120 is associated with electric vehicle 130 located at electric vehicle charging station 100 at step S6050. After sending the request message, wireless access point 110 may wait for receiving one of a confirmation message and an access deny message from service server 200.

In response to the request message from wireless access point 110, service server 200 may determine whether user equipment 120 is associated with an electric vehicle located at electric vehicle charging station 100 or coupled to any electric charging units in electric vehicle charging station 100. In order to determine, service server 200 obtain the user identification information from the request message received from wireless access point 110 and obtain vehicle identification information of electric vehicles coupled to electric charging units (e.g., electric charging unit 140) of electric vehicle charging station 100. Service server 200 may determine whether user equipment 120 is associated with electric vehicle 130 based on the received user identification information and the received vehicle identification information.

As a result of determination, service server 200 may transmit a confirmation message C with the vehicle identification information on an electric vehicle associated with user equipment 120 and information on an electric charging unit coupled to the electric vehicle when service server 200 determines that an associated electric vehicle is located at electric vehicle charging station 100 or coupled to one of electric charging units of electric vehicle charging station 100. Service server 200 may transmit an access deny message D when service server 200 determines that an associated electric vehicle is not located at electric vehicle charging station 100 or not coupled to one of electric charging units of electric vehicle charging station 100.

As a result of determination in service server 200, wireless access point 110 may receive one of a confirmation message with vehicle identification information of an electric vehicle associated with user equipment 120 and an access deny message from service server 200 at step S6060.

When wireless access point 110 receives the access deny message (D-S6060), wireless access point 110 may transmit an error message to user equipment 120 at step S6070. When wireless access point 110 receives the confirmation message (C-S6060), wireless access point 110 may assign an IP address to user equipment 120 at step S6040 and transmit a service request message to service server 200 at step S6080.

As described above, contents server 300 may store a multimedia contents providing history of each user equipment and provide such a multimedia contents providing history to service server 200. Service server 200 may store the multimedia contents providing history in connection with at least one of the user identification information of user equipment 120 and the vehicle identification information of electric vehicle 130 associated with user equipment 120. Such multimedia contents providing history may be used to continuously provide the interrupted multimedia contests to user equipment 120 from the interrupted point when user equipment 120 is connected to service server 200 again. Hereinafter, such operation will be described with reference to FIG. 7.

FIG. 7 illustrates providing multimedia contents from an interrupted point to an electric vehicle in accordance with at least one embodiment.

At step 7010, service server 200 may obtain information on a multimedia contents providing history of user equipment 120 when a communication link is established between user equipment 120 and service server 200 or between user equipment 120 and contents server 300. For example, after wireless access point 110 assigns an IP address to user equipment 120, service server 200 may establish a communication link to user equipment 120 through the assigned IP address and contents server 300 may also establish a communication link to user equipment 120. Upon the generation of such an event, service server 200 may obtain information on the multimedia contents providing history of user equipment 120. The present invention, however, is not limited thereto. Contents server 300 may extract information on the multimedia contents providing history of user equipment 120.

At step 7020, service server 200 may provide the obtained information on the multimedia contents providing history to user equipment 120 with information on interrupted multimedia contents. The obtained information may include information on interrupted multimedia contents that an associated user of user equipment 120 was watching in the last visit to electric vehicle charging station 100. As described, such information may include a type of the multimedia content, a name of the multimedia content, a time of providing the multimedia content, a destination IP address, and an interrupted point of the multimedia content.

At step S7030, user equipment 120 may display the received information on the multimedia contents providing history and receive a user input for selecting the interrupted multimedia contents. For example, user equipment 120 may produce a graphic user interface for displaying the multimedia contents providing history and for enabling an associated user to selecting at least one of interrupted multimedia contents. The associated user may select at least one of interrupted multimedia contents through the provided graphic user interface.

At step S7040, service server 200 may receive a user selection input for selecting at least one of interrupted multimedia contents from user equipment 120 and transmits a multimedia content request message to contents server 300 to continuously provide the selected multimedia contents from an associated interrupted point.

At step S7050, contents server 300 may receive the multimedia content request message with the information on the selected multimedia contents from service server 200 and continuously provide the selected multimedia contents to user equipment 120.

Service server 200 was described as obtaining the multimedia contents providing history after the communication connection is established (e.g., S5040), but the present invention is not limited thereto. For example, service server 200 may obtain the multimedia contents providing history after receiving the charging operation status (e.g., S5060). Furthermore, service server 200 was described as obtaining the multimedia contents providing history and requesting contents server 300 to provide the selected multimedia contents, but the present invention is not limited thereto. For example, contents server 300 may obtain the multimedia contents providing history of user equipment 120, provide the obtained multimedia contents providing history directly to user equipment 120, receive a selection user input directly from user equipment 120, and provide the selected multimedia contents without receiving a request message from service server 200.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing a multimedia contents service to user equipment registered at a service server in connection with an electric vehicle located in a first electric vehicle charging station through a wireless access point installed at the first electric vehicle charging station, the method comprising:
    assigning, by the wireless access point, an Internet Protocol (IP) address to user equipment registered at a service server in connection with an electric vehicle located in the first electric vehicle charging station in response to a connection request message received from the user equipment;
    transmitting a request message to the service server with user identification information of the user equipment and the assigned IP address; and
    receiving predetermined multimedia contents, and delivering the received predetermined multimedia contents to the user equipment registered in connection with the electric vehicle, based on the assigned IP address,
    wherein the assigning includes:
    determining whether the user equipment is previously registered at the service server in connection with the electric vehicle as user equipment permitted to receive the multimedia contents service during an electric charging of the electric vehicle at the first electric vehicle charging station, when the connection request message is received from the user equipment; and
    assigning the IP address to the user equipment when the user equipment is previously registered.

2. The method of claim 1, wherein the assigning includes:
    receiving the connection request message from the user equipment;
    obtaining the user identification information from the connection request message; and
    transmitting the obtained user identification information and a request message for determining whether the user equipment is registered at the service server in connection with the electric vehicle to an associated communication service provider.

3. The method of claim 2, wherein the assigning includes:
    receiving a determination result from the associated communication service provider; and
    assigning the IP address to the user equipment when the determination result indicates that the user equipment is registered user equipment registered at the service server in connection with the electric vehicle.

4. The method of claim 2, comprising:
    determining, by the associated communication service provider, whether the user equipment is previously registered for a service with information on an associated electric vehicle based on registration information stored in the associated communication service provider.

5. The method of claim 2, wherein the assigning includes:
    receiving a confirmation message that confirms the user equipment is registered user equipment and information on an associated vehicle information from the associated communication service provider; and
    determining whether the user equipment is registered at the service server in connection with the electric vehicle located in the first electric vehicle charging station.

6. The method of claim 2, wherein the assigning includes:
    receiving the connection request message from the user equipment;
    obtaining the user identification information from the connection request message; and
    transmitting the obtained user identification information and a request message for determining whether the user equipment is registered at the service server in connection with the electric vehicle.

7. The method of claim 6, wherein the assigning includes:
    receiving a determination result from the service server; and
    assigning the IP address to the user equipment when the determination result indicates that the user equipment registered at the service server in connection with the electric vehicle located in the first electric vehicle charging station.

8. The method of claim 6, comprising:
    determining, by the service server, whether the user equipment is previously registered in connection with the electric vehicle for the multimedia content service with information on the electric vehicle based on registration information stored in the service server.

9. The method of claim 6, comprising:
    determining, by the service server, whether the user equipment is associated with the electric vehicle coupled to at least one of electric charging units included in the first electric vehicle charging station based on the user identification information obtained from the request message and vehicle identification information obtained from the at least one of electric charging units.

10. The method of claim 1, wherein the transmitting includes:
    detecting, by the service server, an electric charging unit coupled to the electric vehicle registered at the service server in connection with the user equipment based on the user identification information and vehicle identification information obtained from at least one of electric charging units included in the first electric vehicle charging station;

requesting, by the service server, a charging operation status to the detected electric charging unit; and providing the predetermined multimedia contents to the user equipment when the service server receives a charging initiation notification message from the detected electric charging unit.

11. The method of claim 10, wherein the providing includes:

transmitting, by the service server, a request message for the predetermined multimedia contents with the user identification information and the assigned IP address to a contents server, wherein the contents server transmits the predetermined multimedia contents to the user equipment based on the assigned IP address in response to the request message.

12. The method of claim 10, comprising:

receiving, by the service server, a charging interruption notification message from the detected electric charging unit; and transmitting a charging completion message to the wireless access point and the contents server in response to the charging interruption notification message, wherein the contents server interrupts transmitting the predetermined multimedia contents to the user equipment in response to the charging completion message and the wireless access point release a communication link to the user equipment in response to the charging completion message.

13. A method of providing a multimedia contents service, by a service server, to user equipment registered at the service server in connection with an electric vehicle located in a first electric vehicle charging station through a wireless access point installed in the first electric vehicle charging station, the method comprising:

receiving, from the wireless access point, a request message with an assigned IP address and user identification information of user equipment transmitting a connection request message to the wireless access point; and providing predetermined multimedia contents to the user equipment registered at the service server in connection with the electric vehicle, based on the assigned IP address when receiving a charging initiation notification message from an electric charging unit coupled to the electric vehicle, wherein the assigned IP address is, by the wireless access point, assigned to the user equipment in response to the connection request message when the user equipment transmitting the connection request message is previously registered at the service server in connection with the electric vehicle as user equipment permitted to receive the multimedia contents service during an electric charging of the electric vehicle located at the first electric vehicle charging station.

14. The method of claim 13, comprising:

detecting the electric charging unit coupled to the electric vehicle based on user identification information included in the request message and vehicle identification information obtained from at least one of electric charging units included in the first electric vehicle charging station; and requesting a charging operation status from the detected electric charging unit.

15. The method of claim 13, wherein the providing includes:

transmitting a multimedia contents request message with the assigned IP address and the user identification information to a contents server when receiving a charging initiation notification message from the electric charging unit coupled to the electric vehicle, wherein the contents server transmits the predetermined multimedia contents to the user equipment based on the assigned IP address and the user identification information.

16. The method of claim 14, comprising:

receiving a charging interruption notification message from the detected electric charging unit; and transmitting a charging completion message to the wireless access point and the contents server in response to the charging interruption notification message, wherein the contents server interrupts transmitting the predetermined multimedia contents to the user equipment in response to the charging completion message and the wireless access point release a communication link to the user equipment in response to the charging completion message.

17. The method of claim 13, comprising:

receiving a request message for determining whether the user equipment is registered at the service server in connection with the electric vehicle located in the first electric vehicle charging station with user identification information of the user equipment;

determining whether the user equipment is previously registered for a service with information on an associated electric vehicle based on registration information stored in the service server; and transmitting a confirmation message to allow the wireless access point to assign an IP address to the user equipment when the user equipment is registered for the service.

18. The method of claim 13, comprising:

receiving a request message for determining whether the user equipment is associated with an electric vehicle located in the first electric vehicle charging station with user identification information of the user equipment;

determining whether the user equipment is registered at the service server in connection with the electric vehicle coupled to at least one of electric charging units included in the first electric vehicle charging station based on the user identification information obtained from the request message and vehicle identification information obtained from the at least one of electric charging units; and transmitting a confirmation message to allow the wireless access point to assign an IP address to the user equipment when the user equipment is registered at the service server in connection with the electric vehicle coupled to one of the electric charging unit based on the user identification information and the vehicle identification information.

19. The method of claim 13, comprising:

obtaining a multimedia contents providing history registered at the service server in connection with the user equipment after establishing a communication link to the user equipment based on the assigned IP address; and providing the obtained multimedia contents providing history to the user equipment, wherein the multimedia contents providing history includes information on previously provided multimedia contents, a name of each provided multimedia content, a time of providing each multimedia content, and an interrupted point of each provided multimedia content.

20. The method of claim 19, comprising:

receiving information on a selected multimedia content from the user equipment; and transmitting a multimedia contents request message to a contents server with information on the selected multimedia contents and an associated interrupted point, wherein the contents server transmits the selected multimedia contents from the associated interrupted point.

* * * * *